(12) United States Patent
Schröder et al.

(10) Patent No.: US 7,136,817 B2
(45) Date of Patent: Nov. 14, 2006

(54) METHOD AND APPARATUS FOR THE VOICE CONTROL OF A DEVICE APPERTAINING TO CONSUMER ELECTRONICS

(75) Inventors: Ernst F. Schröder, Hannover (DE); Hans-Joachim Platte, Hemmingen (DE)

(73) Assignee: Thomson Licensing, Boulogne-Billancourt (FR)

(*) Notice: Subject to any disclaimer, the term of this patent is extended or adjusted under 35 U.S.C. 154(b) by 699 days.

(21) Appl. No.: 09/952,126

(22) Filed: Sep. 14, 2001

(65) Prior Publication Data

US 2002/0035477 A1    Mar. 21, 2002

(30) Foreign Application Priority Data

Sep. 19, 2000  (DE)  ................. 100 46 561

(51) Int. Cl.
  G10L 15/22    (2006.01)
  G10L 21/06    (2006.01)
(52) U.S. Cl. ...................... 704/275; 704/270
(58) Field of Classification Search ........... 704/231, 704/243, 246, 251, 273; 379/88, 88.22; 381/43; 345/334
See application file for complete search history.

(56) References Cited

U.S. PATENT DOCUMENTS

| | | | | |
|---|---|---|---|---|
| 4,757,525 A | * | 7/1988 | Matthews et al. | 379/88.26 |
| 4,866,777 A | * | 9/1989 | Mulla et al. | 704/206 |
| 5,499,288 A | * | 3/1996 | Hunt et al. | 379/88.02 |
| 5,623,539 A | * | 4/1997 | Bassenyemukasa et al. | 379/88.02 |
| 5,752,231 A | * | 5/1998 | Gammel et al. | 704/273 |
| 5,774,858 A | * | 6/1998 | Taubkin et al. | 704/273 |
| 5,774,859 A | * | 6/1998 | Houser et al. | 704/275 |
| 5,835,894 A | * | 11/1998 | Adcock et al. | 704/273 |
| 5,897,616 A | * | 4/1999 | Kanevsky et al. | 704/246 |
| 5,907,326 A | * | 5/1999 | Atkin et al. | 345/866 |
| 5,915,001 A | * | 6/1999 | Uppaluru | 379/88.22 |
| 5,946,653 A | * | 8/1999 | Campbell et al. | 704/243 |
| 6,006,175 A | * | 12/1999 | Holzrichter | 704/208 |
| 6,167,251 A | * | 12/2000 | Segal et al. | 455/406 |
| 6,192,255 B1 | * | 2/2001 | Lewis et al. | 455/558 |
| 6,400,996 B1 | * | 6/2002 | Hoffberg et al. | 700/83 |
| 6,421,453 B1 | * | 7/2002 | Kanevsky et al. | 382/115 |
| 6,498,970 B1 | * | 12/2002 | Colmenarez et al. | 701/36 |
| 6,584,439 B1 | * | 6/2003 | Geilhufe et al. | 704/270 |
| 6,601,762 B1 | * | 8/2003 | Piotrowski | 235/382 |

(Continued)

FOREIGN PATENT DOCUMENTS

WO    WO 95/18441    7/1995

Primary Examiner—Susan McFadden
(74) Attorney, Agent, or Firm—Joseph J. Laks; Robert D. Shedd; Catherine A. Ferguson

(57) ABSTRACT

In the voice control of a device appertaining to consumer electronics, speech inputs of a user are converted into digitized voice signals. First features, which are characteristic of the individual sounds of the speech, and thus permit recognition of the spoken sounds, are extracted from the digitized voice signals. Furthermore, second features, which permit a characterization of the voice of the respective user and are used for distinguishing between the speech inputs of different users, are extracted from the digitized voice signals. This enables the device being operated to distinguish between speech inputs of the present user, which represent operator-control commands, and utterances by other persons, and to respond only to operator-control commands of the present user. Furthermore, the quality of an analysis of the viewing habits of different users can be improved by a distinction between the users.

5 Claims, 2 Drawing Sheets

U.S. PATENT DOCUMENTS

| | | | |
|---|---|---|---|
| 6,654,721 B1 * | 11/2003 | Handelman | 704/270 |
| 6,754,629 B1 * | 6/2004 | Qi et al. | 704/246 |
| 6,785,647 B1 * | 8/2004 | Hutchison | 704/231 |
| 7,047,196 B1 * | 5/2006 | Calderone et al. | 704/270.1 |
| 2003/0040917 A1 * | 2/2003 | Fiedler | 704/500 |
| 2003/0046083 A1 * | 3/2003 | Devinney et al. | 704/273 |

* cited by examiner

METHOD AND APPARATUS FOR THE VOICE CONTROL OF A DEVICE APPERTAINING TO CONSUMER ELECTRONICS

FIELD OF THE INVENTION

The invention relates to a method and an apparatus for voice control of a device appertaining to consumer electronics.

BACKGROUND OF THE INVENTION

The operator control of devices appertaining to consumer electronics, such as television sets or video recorders for example, can be simplified for the user by voice control. For instance, it is known to use voice control for changing device settings, executing operator-control functions, such as for example choice of a station, or performing programming operations.

For this purpose, the operator-control commands spoken by the user are initially detected as sound signals, converted into electric signals and digitized. The digitized voice signals are then fed to a speech recognition system. The speech recognition is usually based here on an acoustic model and a speech model. The acoustic model uses a large number of speech patterns, with mathematical algorithms being used to indicate the words which acoustically best match a spoken word. The speech model in turn is based on an analysis in which it is established on the basis of a large number of document samples in which context and how often certain words are normally used.

Current systems provide that the operator-control commands are spoken into the microphone integrated in a remote control unit. Deterioration of the recognition rate caused by disturbing background noises is prevented by the remote control unit being held directly in front of the user's mouth. However, as in the case of conventional remote control units, this requires that the user still has to pick up the remote control unit. Convenience can be enhanced if, for speech input, one or more microphones are provided in the device appertaining to consumer electronics, so that the user can carry out operator control from any desired place in the room without taking along the remote control unit. The required suppression of background disturbances can in this case take place by the use of special microphone arrays and methods such as "statistical beam forming" or "blind source separation". However, the device being operated is not capable of determining which speech inputs are made by the current user. It is therefore not possible to respond only to these operator-control commands but to ignore utterances by other persons.

A further attempted way of enhancing user convenience is the automatic buffer storage of television programs on hard disks integrated in televisions or settop boxes. After an analysis of the viewing habits, in this case the programs or types of programs which the user has previously chosen regularly are automatically recorded. If the user then switches on his television at any time, he can, with a certain degree of probability, view his favourite programs. However, the analysis is impaired by the fact that it is not possible to distinguish which user operates the television at which time.

SUMMARY OF THE INVENTION

The invention is based on the object of specifying a method for voice control which avoids the aforementioned disadvantages. This object is achieved by the method specified in claim 1.

In principle, the method for the voice control of a device appertaining to consumer electronics consists in converting a user's speech inputs into digitized voice signals. From the digitized voice signals, first features, which are characteristic of individual sounds of the speech, and thus permit recognition of the spoken sounds, are extracted. Furthermore, second features, which permit a characterization of the voice of the respective user and are used for distinguishing between the speech inputs of different users, are extracted from the digitized voice signals. After a voice command from a first user, further voice commands are accepted only from this first user, by testing the further speech inputs for characteristic voice features and only accepting them if they can be assigned to the same speaker on the basis of these features.

It can consequently be ensured that, in given time periods, only one of a number of simultaneous users can operate the device concerned by voice control—similarly to the case in which only one of a number of users has a matching remote control unit.

In particular, it may be advantageous for a voice command for switching on the device to be accepted from any first user and, after that, only voice command inputs from this first user to be accepted.

A voice command for switching off the device may preferably be accepted only from the first user, it being possible after switching off the device for voice commands to be accepted again from any user.

For certain applications, however, it may also be advantageous for a voice command for switching off the device to be accepted from any user.

Similarly, an operator-control command which, after its input by the first user, allows voice commands from a second user to be accepted may be advantageously provided. This makes it possible to pass on operator-control authority in a way corresponding to the passing on of a remote control unit from a first user to a second user.

It may be particularly advantageous for an identification of the various users to take place in order to perform an analysis of the viewing habits and create user profiles of the various users from this analysis.

A user profile obtained in this way is preferably used in a buffer storage of television programs in order to permit separate buffer storage of preferred programs for different users.

Similarly, the user profile may be used to make proposals for programs to be viewed, suited to the viewing habits of the various users.

BRIEF DESCRIPTION OF THE DRAWINGS

Exemplary embodiments of the invention are described on the basis of the drawings, in which FIG. 1 schematically shows the method sequence for distinguishing between the voice commands of various users in order to accept future voice commands only from certain users.

DETAILED DESCRIPTION OF PREFERED EMBODIMENTS

Figure 1:
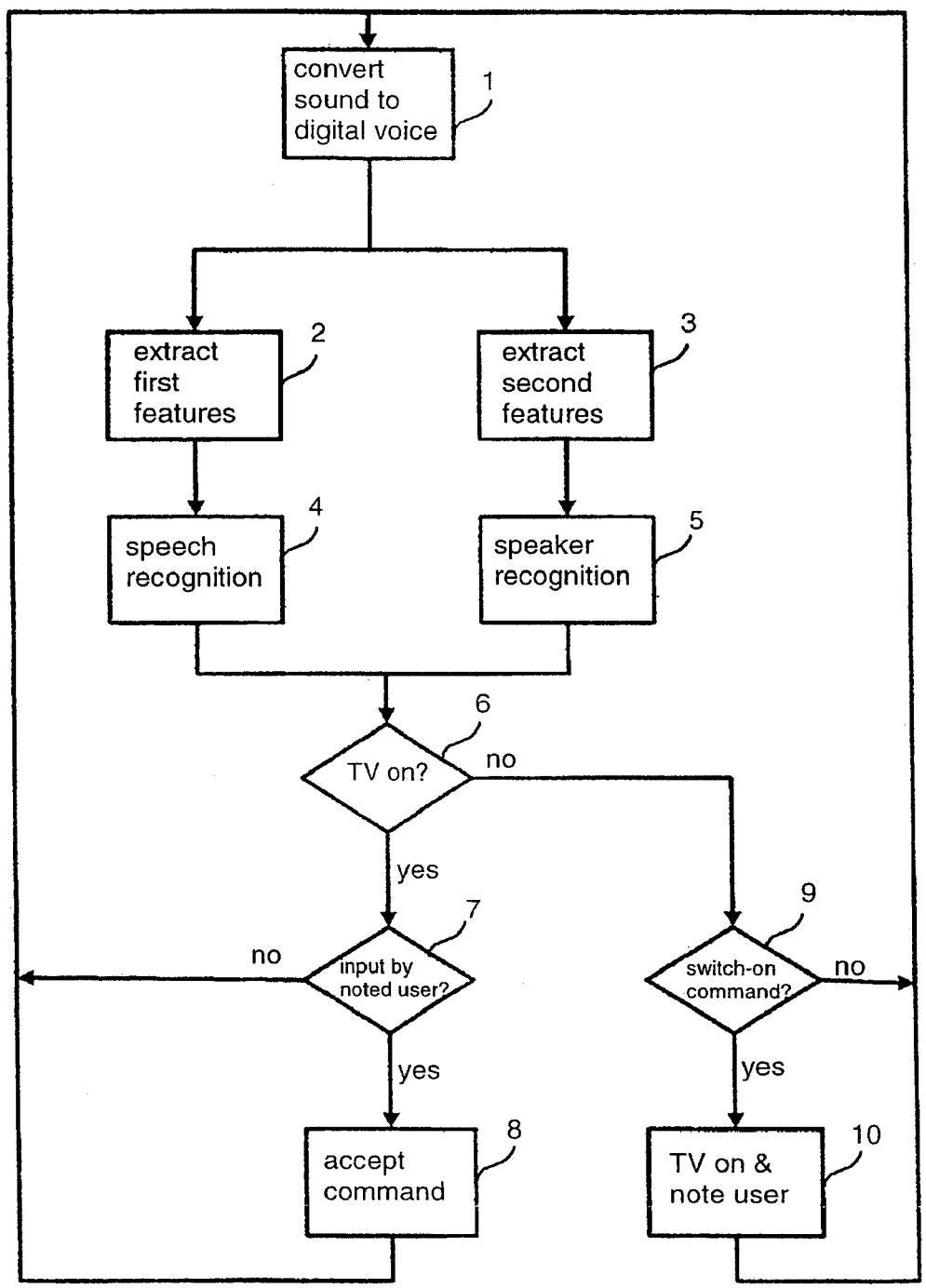

The sequence of a first exemplary embodiment is schematically represented in FIG. 1 in the form of a flow diagram. In the case of a voice-controlled television, a distinction is made between the speech inputs of various users, in order to accept future speech inputs only from certain users.

Firstly, in a first method step 1, the sound signals are converted into electric signals, to produce an analogue voice signal, which in turn is converted into a digital voice signal.

Then, in a next method step 2, first features, which are as typical as possible of the individual sounds of the speech and are robust with respect to disturbances and variations in pronunciation, are obtained from the digitized acoustic signal. Similarly, in method step 3, second features, which permit a characterization of the voice of the respective user and are used for distinguishing between the speech inputs of various users, are extracted from the digitized acoustic signal. In the exemplary embodiment presented, this extraction of features takes place separately for the speech recognition unit and the speaker recognition unit, but may also take place jointly.

On the basis of the first features, the actual speech recognition then takes place in method step 4. In method step 5, a speaker recognition is carried out with the aid of the second features, in order to identify the user speaking at the time. Similarly, however, only the second features may be stored, to allow differentiation from other users without an identification of the individual users taking place.

In method step 6, it is then checked whether the television has already been switched on. If this is the case, method steps 7 and 8 are executed, otherwise method steps 9 and 10. In the event that the television has not yet been switched on, it is next checked in method step 9 whether a switch-on command, such as for example "on" or "television on" has been given. If this is the case, in method step 10 the television is switched on and the user from whom the input originates is noted. If, instead of an identification, only a distinction between different users takes place, the second features, which characterize the current user, are correspondingly stored. Subsequently, in a way similar to that for the case in which no switch-on command had been given in method step 9, a return is made to method step 1.

In the case of an already switched-on television, method step 6 is followed by method step 7. In this step, it is checked whether the speech input was by the user already previously noted in method step 10. If this is the case, the input command for controlling the voice-controlled system is used in method step 8, for example for menu control or navigation. Subsequently, in a way similar to that for the case in which a change among the users was established in method step 7, a return is made to method step 1.

Various modifications of this exemplary embodiment are conceivable. For instance, a speech input for switching off the device may also be accepted from any user. Similarly, an operator-control command which, when input by the first user, also allows speech inputs of a second user or further users to be accepted in future may be provided.

Figure 2:
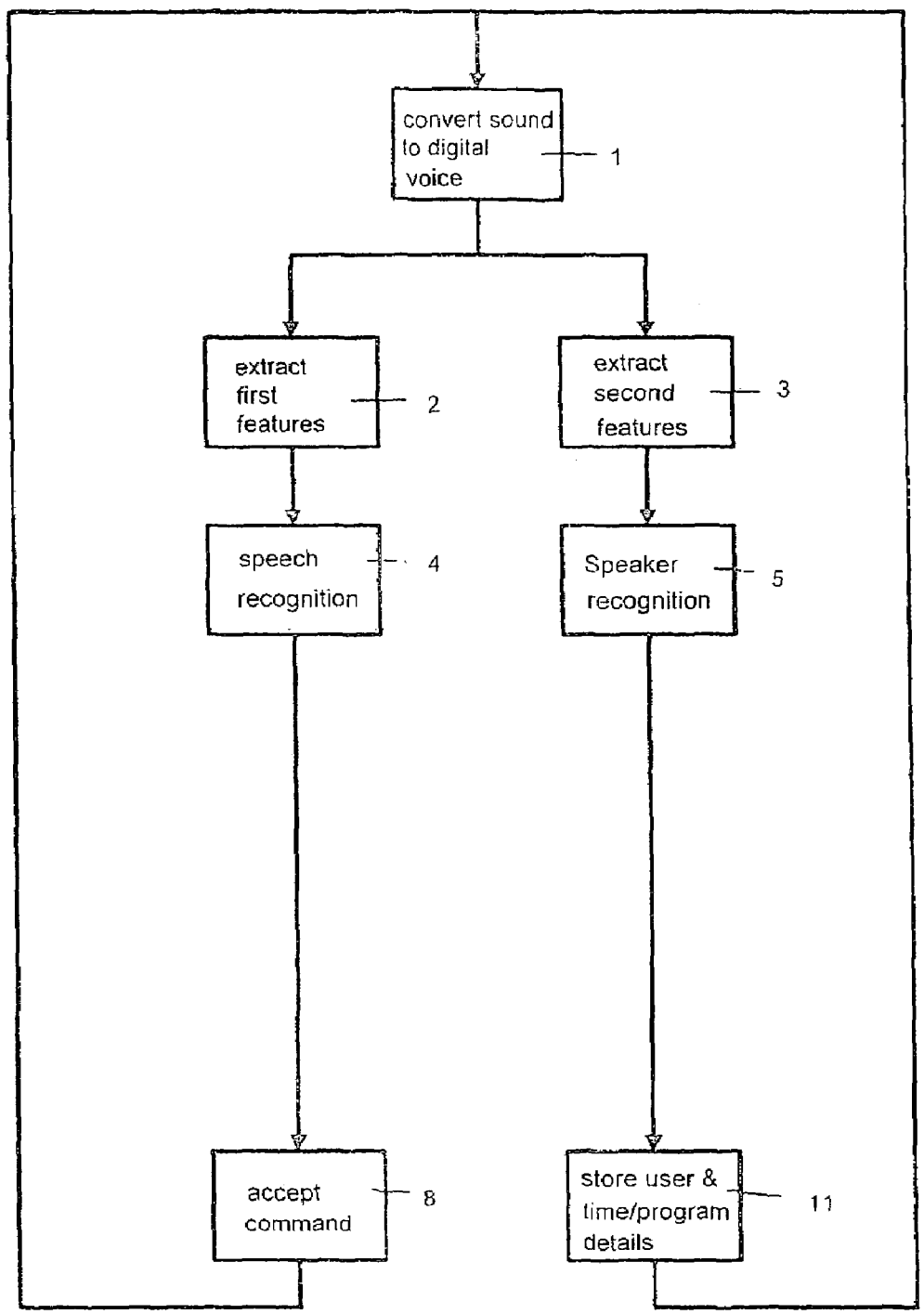
FIG. 2 schematically shows the method sequence for identifying various users in order to create user profiles of the various users from this identification.

The sequence of a second exemplary embodiment is schematically represented in FIG. 2 in the form of a flow diagram. In this case, an identification of various users of a voice-controlled television takes place, in order to create user profiles for these users from this identification.

Method steps 1 to 5 coincide here to the exemplary embodiment from FIG. 1, although in method step 5 it is essential to identify the user speaking at the time. On the other hand, the various branches in method steps 6, 7, and 9 are now not necessary. The operator-control commands corresponding to speech input are executed in method step 8. Furthermore, in method step 11, the identified user from which the input originates is stored together with details on the current time and the television channel or details on the program being broadcast at the time. These details may already be available here in the television set or else be transmitted with the television signal as additional signal, in the case of analogue television signal in particular in the vertical blanking interval. For example, the time of day from an internal clock can be used, or else the time signal transmitted in teletext may be evaluated. Similarly, the television channel may be determined directly from the program site of the television set chosen at the time or else from corresponding details in the teletext or VPS signal 12. Finally, details on the program being broadcast at the time, i.e. the title or the genre, for example entertainment, sport etc., may be taken from an EPG already in the device or else correspondingly transmitted data.

The user profiles determined by the use of the speech recognition can be used in particular in the buffer storage of TV programs on hard disks or similar storage media which are provided in televisions and settop boxes. The accuracy of the analysis of the viewing habits is significantly increased in this case by the recognition of the respective user. For the example of a family in which the children spend significantly more time in front of the television than the parents, the hard disk is therefore no longer filled only with children's programs. Rather, the additional speaker recognition allows the viewing habit analysis to be created separately for a number of members of the family. The limited buffer memory space of the hard disk can then be divided among the individual users in accordance with a specific key, so that each user is given his predetermined share of buffer-stored television programs.

Similarly, user profiles determined by the use of speech recognition can also be used for the recording of radio programs or other transmitted data.

For the detection of the voice signals, a single microphone or else a microphone array comprising two or more microphones may be provided. The microphone array may, for example, be integrated in a television receiver. The microphones convert the detected sound signals into electric signals, which are amplified by amplifiers, converted by AD converters into digital signals and then fed to a signal processing unit. The latter can take into account the respective place where the user is located by a different scaling or processing of the detected sound signals. Furthermore, a correction of the microphone signals with respect to the sound signals emitted from the loudspeakers may also take place. The signal conditioned in this way is then fed to the speech recognition unit and speaker recognition unit, it being possible for algorithms or hardware units to be configured separately or else jointly. The commands determined and the identity of the user are then finally fed to a system manager for controlling the system.

The invention may be used for the voice remote control of a wide variety of devices appertaining to consumer electronics, such as for example TV sets, video recorders, DVD players, satellite receivers, combined TV-video systems, audio equipment or complete audio systems.

What is claimed is:

1. Method for the voice control of a device appertaining to consumer electronics, comprising:

converting speech inputs of a user into digitized voice signals;

extracting first features, which are characteristic of individual sounds of the speech, and thus permit speech recognition of the spoken sounds, from the digitized voice signals;

converting said extracted first features into voice commands for controlling said device;

extracting second features, which permit a characterization of the voice of the respective user and are used for distinguishing between the speech inputs of different users, from the digitized voice signals; and accepting after a voice command from a first user further voice commands only from this first user, by testing whether said second features of further speech inputs corresponding to said further voice commands-can be assigned to the same user.

2. Method according to claim 1, wherein an identification of the various users takes place and an analysis of the viewing habits of the identified users is performed in order to create user profiles of the various users from this analysis.

3. Method according to claim 2, wherein the user profile is used in a buffer storage of television programs in order to permit separate buffer storage of preferred programs for different users.

4. Method according to claim 2, wherein the user profile is used to make proposals for programs to be viewed to the users identified.

5. Apparatus for the voice control of a device appertaining to consumer electronics, comprising:

means for converting speech inputs of a user into digitized voice signals;

means for extracting first features, which are characteristic of individual sounds of the speech, and thus permit speech recognition of the spoken sounds, from the digitized voice signals;

means for converting said extracted first features into voice commands for controlling said device;

means for extracting second features, which permit a characterization of the voice of the respective user and are used for distinguishing between the speech inputs of different users, from the digitized voice signals; and means for accepting after a voice command from a first user further voice commands only from this first user, by testing whether said second features of further speech inputs corresponding to said further voice commands can be assigned to the same user.

* * * * *